United States Patent [19]

Eustache et al.

[11] Patent Number: 5,236,402
[45] Date of Patent: Aug. 17, 1993

[54] SHROUDED WINDSHIELD WIPER ASSEMBLY

[75] Inventors: Jean-Pierre Eustache, Antony; Gilles Berge, Clairefontaine-en-Yvelines; Claude Henry, Champigny-sur-Marne, all of France

[73] Assignee: Valeo Systemes d'Essuyage, Montigny-le-Bretonneux, France

[21] Appl. No.: 725,666

[22] Filed: Jul. 3, 1991

[30] Foreign Application Priority Data

Jul. 5, 1990 [FR] France .................. 90 08544

[51] Int. Cl.⁵ .................. B60S 1/32; B60S 1/04
[52] U.S. Cl. .................. 15/250.42; 15/250.35; 15/250.31
[58] Field of Search .......... 15/250.42, 250.35, 250.32, 15/250.41, 250.31, 250.29, 250.24

[56] References Cited

U.S. PATENT DOCUMENTS

| 2,859,468 | 11/1958 | O'shei .................. 15/250.42 |
| 3,665,544 | 5/1972 | Sakamoto .................. 15/250.35 |

FOREIGN PATENT DOCUMENTS

| 203327 | 9/1956 | Australia .................. 15/250.35 |
| 280149 | 8/1988 | European Pat. Off. . |
| 2417714 | 10/1975 | Fed. Rep. of Germany ... 15/250.42 |
| 2842233 | 4/1980 | Fed. Rep. of Germany ... 15/250.42 |
| 3125625 | 7/1983 | Fed. Rep. of Germany . |
| 3532535 | 3/1987 | Fed. Rep. of Germany . |
| 2526382 | 11/1983 | France . |
| 2618398 | 1/1989 | France . |
| 2652325 | 3/1991 | France .................. 15/250.35 |
| 0146658 | 7/1986 | Japan .................. 15/250.42 |
| 0155042 | 7/1986 | Japan .................. 15/250.35 |

Primary Examiner—Harvey C. Hornsby
Assistant Examiner—Gary K. Graham
Attorney, Agent, or Firm—Wenderoth, Lind & Ponack

[57] ABSTRACT

A windshield wiper assembly, especially though not exclusively for a motor vehicle, includes a shroud extending at right angles to a windshield wiper motor axis. A wiper arm is coupled to the axis and is articulated to the shroud. The assembly includes an armature and a wiping strip depending from the armature. The armature includes a plurality of members which are articulated together through pivots, and some of these members constitute part of the shroud over part of their length, such that the armature is part of the enclosing shroud. Yokes which distribute the applied pressure to the wiping strip are themselves pivoted to the armature and supported from the same pivots.

9 Claims, 1 Drawing Sheet

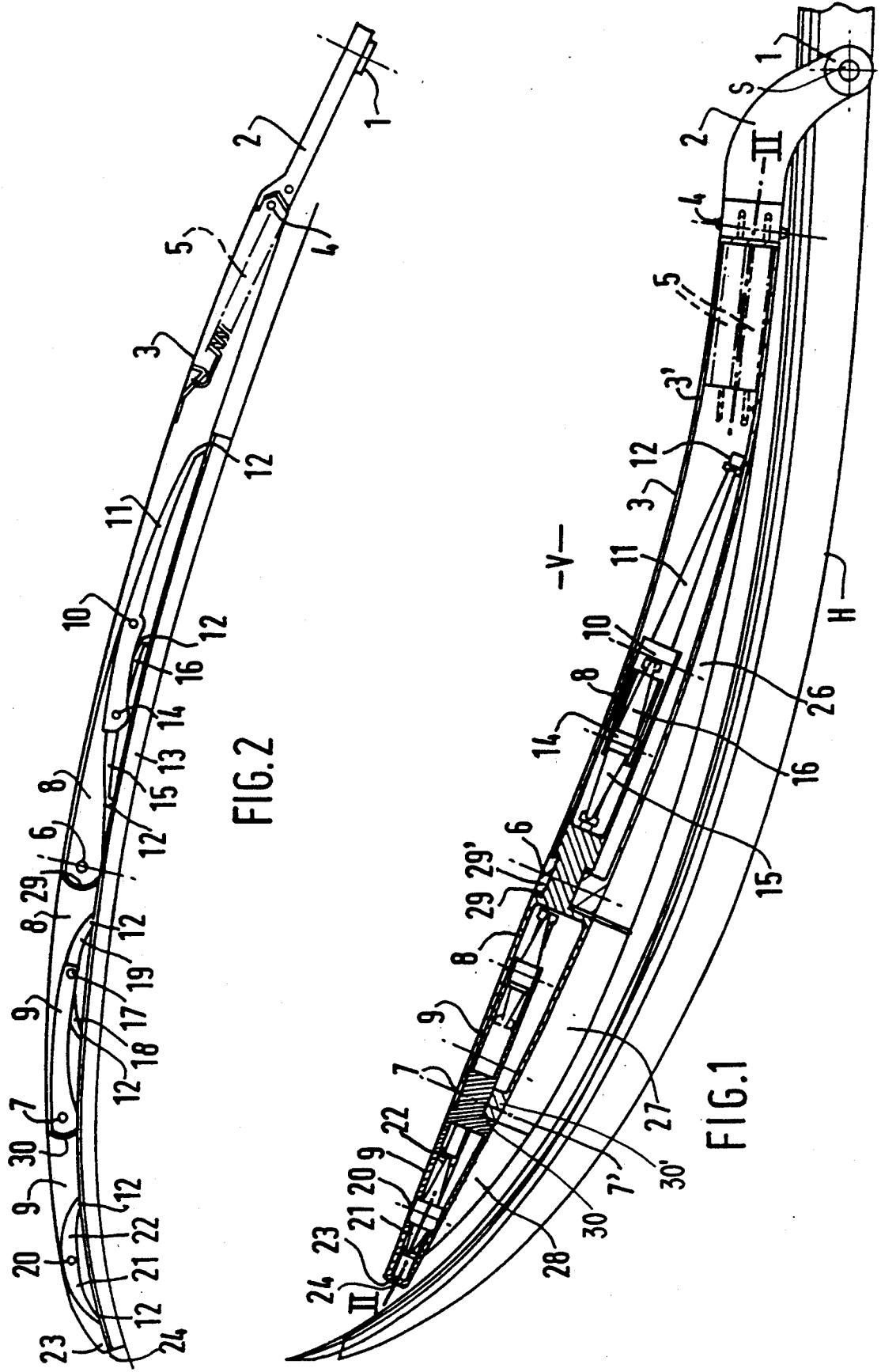

SHROUDED WINDSHIELD WIPER ASSEMBLY

FIELD OF THE INVENTION

This invention relates to windshield wiper assemblies of the shrouded type, suitable especially, though not exclusively, for use with motor vehicles.

BACKGROUND OF THE INVENTION

For sweeping glass surfaces such as motor vehicle windshields, it is well known to use windshield wiper assemblies which move in oscillating movement in contact with the swept surface of the glass in order to maintain good visibility through the glass, with the windshield wiper assembly having a wiper blade. The wiper blade is generally driven, through an appropriate articulated linkage, by means of a windshield wiper arm which is itself driven by a wiper mechanism to which it is coupled. Most often, the windshield wiper arm is driven in a rotary oscillating movement by means of the output or drive spindle of a drive mechanism which is carried by the body of the vehicle, the drive spindle having a head which is formed with a bore by which it is mounted on the wiper arm, and being coupled to the wiper blade through a shroud.

A cylindrical pivot, generally in the form of a rivet, is usually provided between the head and the shroud. A spring is interposed between the arm or the shroud, on the one hand, and the head on the other hand, so as to apply a predetermined degree of pressure against the swept surface of the windshield during operation.

The cross sectional shape of the shroud is usually in the form of an inverted U, defining side flank portions between which the return spring mentioned above is mounted. This spring is able to work either in compression or in tension, as appropriate for the application to which the windshield wiper is to be put. The wiper blade has an armature which is linked to the flexible wiping strip of the blade that makes the actual contact with the swept surface.

One essential precondition for satisfactory operation of the windscreen wiper is that the applied pressure, i.e. the pressure exerted on the swept surface, should be substantially uniformly distributed over the whole length of the wiping strip. The achievement of this objective is complicated by the fact that windshields of modern vehicles are usually curved. In order to obtain the required distribution of applied pressure on a curved surface, it is known to couple the wiping strip to the armature of the blade through stirrups, yokes, or balancing elements or levers having two branches, which are pivotally mounted on the armature of the blade, and thus, by means of positional adjustment, to provide a substantially uniform pressure distribution.

One example of such an assembly is described and shown in the specification of French published patent application No. FR 2 618 398A, in which a series of small cranks are pivoted on the armature. Unfortunately, though satisfactory as regards pressure distribution, this arrangement is visually unattractive. In addition, it requires a large number of pivot points, and this results in a somewhat high selling price.

SUMMARY OF THE INVENTION

A primary object of the present invention is to provide a windshield wiper assembly in which all of the mechanical pressure distribution elements are integrated into a shroud. A further object is to conceal this mechanism.

Another object of the present invention is to provide a windshield wiper assembly the construction of which is simplified as compared with that of known windshield wiper assemblies described above.

According to the present invention, there is provided a windshield wiper assembly comprising a shroud having a transverse cross section in the form of an inverted U and enclosing a return spring between its flanks, an armature connected with the shroud, on which there is articulated at least one pressure distributing yoke the lower part of which is connected to a wiping strip for distributing pressure applied to the latter, characterised in that the shroud is articulated in at least one pivot point along its length, in a direction at right angles or orthogonal to that of the axis of rotation of the drive spindle of the windshield wiper drive mechanism, and in that the or each pivot of the shroud also constitutes a pivot for a main yoke the lower part of which is secured directly or indirectly to the wiping strip.

In this way, all of the mechanical elements are integrated between the flank portions of the generally channel-shaped shroud, which consists of a plurality of components articulated together about transverse pivot axes, with only the wiping strip itself projecting from the lower part of the shroud. The flexibility of the wiping strip enables it to follow the deformations of the shroud. In addition, the articulated form of the shroud enables relatively rigid and strong plastic moldings to be used in its construction.

Apart from the above, the one or more pivot points at which the shroud is articulated also constitute pivot axes for the yokes which distribute the applied pressure to the wiping strip. This achieves economy in the number of pivots that have to be provided.

Further features and advantages of the invention will appear more clearly from a reading of the description which follows, showing one particular preferrred embodiment of the invention, given by way of non-limiting example only and with reference to the accompanying drawings.

BRIEF DESCRIPTION OF THE DRAWINGS

FIG. 1 is a view in horizontal cross section of a windshield wiper assembly in accordance with the invention.

FIG. 2 is a view of the same wiper assembly, but seen in vertical cross section taken on the line II—II in FIG. 1.

DESCRIPTION OF A PREFERRED EMBODIMENT OF THE INVENTION

FIG. 1 shows at H a portion of the body of a motor vehicle. The drive spindle of an oscillating windshield wiper drive mechanism extends from the upper part of the body portion H. A windshield wiper head 1 is fixed on the end of this drive spindle. A windshield wiper lever 2 extends from the head 1. A shroud 3 is pivotally mounted on the free end of the arm or lever 2 so as to extend in a direction at right angles to the axis of the drive spindle. The shroud 3 has a "streamlining" effect, and is attached to the windshield wiper lever 2 by, for example, a rivet 4. The shroud 3 is urged toward a glass, generally indicated a V and being for example the windshield of the vehicle, by means of a return spring or a group of springs 5. By virtue of being pivoted about the axis 4 defined by the rivet mentioned above, a windshield wiper blade or strip 13 may be disengaged from the surface of the glass V, so that the blade can be moved to an inoperative position.

The shroud 3 functions as the armature or support body of the windshield wiper blade, and comprises a first shroud member 3', which is extended towards the left (as seen in the Figures), in succession, by a second shroud member 8 and a third shroud member 9. The second shroud member 8 is pivoted on the first shroud member 3' by means of a pivot 6, while the third shroud member 9 is pivoted on the end of the shroud member 8 opposite from the pivot 6 by means of a further pivot 7. The members 8 and 9 are provided with hubs 29 and 30 which engage against corresponding bearing elements 29' and 30' formed on the ends of the adjacent member 3' and 8 respectively, so as to permit respective relative pivoting movement providing displacement of the order of about 10°.

The pivots 6 and 7 not only couple the shroud members 3', 8 and 9 together pivotally, but also provide a means for articulation of certain stirrups, yokes or balancing elements for balancing the distribution of the pressure exerted, through the wiping strip or blade 13, on the swept surface V. The shroud members 8 and 9 themselves constitute main yokes on which secondary yokes are articulated. However, these main yokes 8 and 9 also form part of the shroud 3. In this connection, the left hand part (as seen in FIG. 2) of the shroud member 8 can be seen around the pivot 6, while the right hand part of the same member is overlaid by the first shroud member 3', and is able to pivot inside the latter. The left hand portion of the shroud member 8 has a transverse cross section in the form of an inverted U, while its right hand portion may consist of two parallel bar elements. The same is true for the shroud member 9.

As can be seen from the drawings, the right hand end of the shroud member or main yoke 8 is formed with a stirrup member or portion 10, in which a balancing member 11, having two branches, is mounted. The balancing member 11 terminates in the lower portion of one of its ends in a gripping or retaining element 12, which is adapted to be inserted in a groove provided in the upper part of the wiping strip 13. All of the balancing members or yokes that will be mentioned in the remainder of this description are provided with these gripping or retaining elements 512, the purpose of which is to secure the wiping strip 13 positively. The wiping strip is not removable.

At the opposite end of the balancing member 11, i.e. the end on the opposite side of the stirrup portion 10 from the gripping element 12, is formed a further stirrup member or portion 14. A secondary yoke, having two branches 15 and 16, is mounted on this stirrup portion 14. The lower portions of the two branches 15 and 16 are secured to the wiping strip 13 by means of further gripping elements 12. The third shroud member or main yoke 9 is pivotally mounted in a further stirrup member or portion 7' which is formed on the left hand end of the other main yoke 8. As before, the left hand portion of the shroud member 9 is exposed and forms part of the shroud 3, while its right hand portion is overlaid by the shroud member 8. The branch of the shroud member 9 which extends to the right includes at its end another stirrup member or portion 17. A further secondary yoke, comprising two branches 18 and 19, is pivotally mounted to the stirrup portion 17.

Finally, a third secondary yoke, having two branches 21 and 22 secured to the wiping strip 13, is mounted on a pivot pin 20 which is fitted within the left hand portion of the shroud member 9.

By virtue of this system of yokes, and its articulation, the shroud 3 is able to deform progressively while maintaining uniform pressure on the glass V, regardless of the curvature of the windshield. The free end of the shroud 3 is closed on the wiping strip 13 as indicated at 23, this end of the shroud being defined by a wall 24 at the free end of the shroud member 9.

With this arrangement, the number of pivots which are theoretically necessary can be reduced, and this substantially reduces manufacturing costs. In addition, the assembly is fully shrouded. By virtue of the pivots 6 and 7, the shroud 3 may be formed of a relatively rigid molded material. During the molding operation, it is possible to form deflectors 26, 27 and 28 in the lower portion of the shroud, as can readily be seen from FIG. 1. These deflectors enable the wiping strip 13 to be maintained in contact with the swept surface V when the vehicle is travelling at a high speed. Under these circumstances, air pressure tends to disengage windshield wipers from the glass by lifting the wiper blades, which is detrimental to effective wiping action.

Although in the example just described, the shroud has two pivots, this number may be varied according to the length required for the windshield wiper assembly. In some cases, one single pivot may be enough. In addition, the mechanical system for distributing the applied pressure may consist of any combination of main and secondary yokes whatsoever. Thus for example, a mechanical assembly of yokes, of the same kind as that which is mounted on the pivot 6, may be mounted on the pivot 7.

In addition, the shroud 3 may extend over a major part of the length of the wiping strip, or it may extend over its entire length.

Numerous variants of course may be introduced without departing from the scope of the present invention, in particular by substitution of mechanically equivalent means where desired.

What is claimed is:

1. A windshield wiper assembly comprising:
   a lever having means to be coupled to a drive spindle for reciprocation of said lever about a drive axis;
   a shroud connected to said lever and extending therefrom in a direction substantially transverse to and outwardly from said drive axis;
   said shroud comprising at least first, second and third separate shroud members spaced in said direction;
   said first shroud member being pivoted to said lever about a pivot axis and having a transverse cross-sectional configuration in the form of an inverted U defining flank portions;
   said second shroud member being pivoted to said first shroud member about a first pivot, said second shroud member including a shroud portion having a transverse cross-sectional configuration in the form of an inverted U and extending from said first pivot in said direction and a yoke portion extending from said first pivot opposite to said shroud portion and positioned within said first shroud member;
   said third shroud member being pivoted to said second shroud member about a second pivot, said third shroud member including a shroud portion having a transverse cross-sectional configuration in the form of an inverted U and extending from said second pivot in said direction and a yoke portion extending from said second pivot opposite to said shroud portion of said third shroud member and positioned within said shroud portion of said second shroud member;

return spring means positioned between said flank portions of said first shroud member and mounted to said first shroud member for biasing said shroud about said pivot axis relative to said lever toward a windshield surface to be wiped;

said yoke portions of said second and third shroud member having connected thereto respective secondary yokes; and a wiping strip to wipe the windshield surface, said wiping strip being secured to said secondary yokes.

2. A wiper assembly as claimed in claim 1, wherein said yoke portion of said second shroud member has pivoted to a free end thereof a balancing member having opposite ends.

3. A wiper assembly as claimed in claim 2, wherein a first end of said balancing member is secured to said wiping strip, and a second end of said balancing member has pivoted thereto a said secondary yoke having opposite ends secured to said wiping strip.

4. A wiper assembly as claimed in claim 1, wherein said yoke portion of said third shroud member has pivoted to a free end thereof a said secondary yoke having opposite ends secured to said wiping strip.

5. A wiper assembly as claimed in claim 4, wherein said shroud portion of said third shroud member has pivoted therein a said secondary yoke having opposite ends secured to said wiping strip.

6. A wiper assembly as claimed in claim 1, wherein said third shroud member has a free end defined by a terminal wall.

7. A wiper assembly as claimed in claim 1, wherein at least one said shroud member has extending from a flank portion thereof a flange defining a deflector.

8. A wiper assembly as claimed in claim 1, wherein said shroud extends over a major portion of the length of said wiping strip.

9. A wiper assembly as claimed in claim 1, wherein said shroud extends over the entire length of said wiping strip.

* * * * *